United States Patent
Ponniah et al.

(10) Patent No.: US 12,443,903 B2
(45) Date of Patent: Oct. 14, 2025

(54) DETERMINING DYNAMIC WORKFLOWS

(71) Applicant: INTERNATIONAL BUSINESS MACHINES CORPORATION, Armonk, NY (US)

(72) Inventors: Anbumunee Ponniah, Bangalore (IN); Gandhi Sivakumar, Bentleigh (AU); Yuhong Yin, Westford, MA (US); Shweta Shandilya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 18/297,800

(22) Filed: Apr. 10, 2023

(65) Prior Publication Data

US 2024/0338627 A1    Oct. 10, 2024

(51) Int. Cl.
*G06Q 10/0633* (2023.01)
*G06Q 10/0637* (2023.01)
*G06Q 10/0639* (2023.01)

(52) U.S. Cl.
CPC ... *G06Q 10/0633* (2013.01); *G06Q 10/06375* (2013.01); *G06Q 10/06393* (2013.01)

(58) Field of Classification Search
None
See application file for complete search history.

(56) References Cited

U.S. PATENT DOCUMENTS

| | | | | |
|---|---|---|---|---|
| 7,155,400 B1 * | 12/2006 | Jilk | ............... | G06Q 10/06316 705/7.41 |
| 2001/0021913 A1 * | 9/2001 | Leymann | ............. | G06F 9/4881 718/103 |
| 2008/0154712 A1 | 6/2008 | Wellman | | |
| 2012/0078678 A1 * | 3/2012 | Pradhan | ............. | G06Q 10/0633 705/7.27 |
| 2014/0095181 A1 * | 4/2014 | Johnson | ................ | G16H 10/60 705/2 |
| 2015/0310362 A1 | 10/2015 | Huffman | | |
| 2017/0068521 A1 | 3/2017 | Bertran Monfort et al. | | |

(Continued)

FOREIGN PATENT DOCUMENTS

EP    2107514 A1 * 10/2009    ............. G06Q 10/06

OTHER PUBLICATIONS

Matthias et al "Workflow disruptions and provider situation awareness in acute care: An observational study with emergency department physicians and nurses", Dec. 2020, Applied Ergonomics, pp. 1-9 (Year: 2020).*

(Continued)

*Primary Examiner* — Romain Jeanty
(74) *Attorney, Agent, or Firm* — Elliot Shine, Esq.; Rachel L. Pearlman, Esq.; Heslin Rothenberg Farley & Mesiti P.C.

(57) ABSTRACT

Computer implemented method, systems, and computer program products include program code executing on a processor(s) mapping, based on analyzing two or more nodes over which tasks comprising the workflow are distributed, each node to one or more parameters utilized to evaluate efficacy of the workflow. The processor(s) determines, based on the mapping, costs associated with each node and costs associated with changes to each node. The processor(s) identifies tasks in the workflow that can be changed to counter disruptions impacting at least one parameter of the one or more parameters utilized to evaluate the efficacy of the workflow.

18 Claims, 4 Drawing Sheets

(56) References Cited

U.S. PATENT DOCUMENTS

| | | | | |
|---|---|---|---|---|
| 2017/0249574 | A1* | 8/2017 | Knijnik | G06Q 10/06313 |
| 2017/0337492 | A1 | 11/2017 | Chen et al. | |
| 2018/0268507 | A1* | 9/2018 | Johnson | G16H 40/20 |
| 2018/0308022 | A1 | 10/2018 | Philips et al. | |
| 2019/0303831 | A1 | 10/2019 | Martin et al. | |
| 2020/0175778 | A1 | 6/2020 | Ziegler et al. | |
| 2020/0193263 | A1* | 6/2020 | Pham | H04L 41/22 |
| 2020/0349482 | A1* | 11/2020 | Grossman | G06N 3/088 |
| 2022/0398141 | A1* | 12/2022 | Methvin | G06F 9/542 |
| 2023/0007880 | A1* | 1/2023 | Houde | G06Q 30/0611 |
| 2024/0312585 | A1* | 9/2024 | Asami | G16H 20/10 |

OTHER PUBLICATIONS

D Nasonov "Hybrid evolutionary workflow scheduling algorithm for dynamic heterogeneous distributed computational environment", Dec. 2017, Journal of Applied Logic (Year: 2017).*

M. Millie Kwan et al."Dynamic Workflow Management: A Framework for Modeling Workflows", Dec. 1997, IEEE, pp. 367-376 (Year : 1997).*

Sutherland, J., "Towards an Intelligent Hospital Environment: Adaptive Workflow in the OR of the Future", 2006, 10 pgs.

Schiefer, J., "Event-Driven Rules for Sensing and Responding to Business Situations", Jun. 2007, 9 pgs.

Spaven, D., "Real Time Policy Management of Workflows for SLA Adherence" https://www.academia.edu/2889315/Real_time_policy_based_management_of_workflows_for_SLA_Adherence, Apr. 10, 2023, 9 pgs.

Blos, M., "A Framework for Designing Supply Chain Disruptions Management Considering Productive Systems and Carrier Viewpoints" Mar. 8, 2018, 18 pgs.

* cited by examiner

DETERMINING DYNAMIC WORKFLOWS

BACKGROUND

The present invention relates generally to the field of workflow optimization and maintenance.

In general, a workflow involves multiple steps and paths that are conditionally traversed. An optimized workflow can assess (statically or dynamically) the cost of each path and select or recommend a path that balances one or more objectives of the workflow with the various costs of the available paths. Dynamic workflows go a step further and re-assess costs of available paths at each step so that optimization is performed until the final step of the workflow has been completed. Typically, a delay in a step in a workflow can cause a cascading delay in the subsequent flow. For example, in a supply chain fulfilment scenario, a delay in updating inventory counts could lead to out of stock situations that may keep an order on hold or in an oversell state until the counts are corrected. Such a delay could delay the shipment of the product and potentially miss the service level agreement (SLA) of the order's promised delivery date. As another example, in a human resources-related workflow, specifically, hiring a new team and transitioning knowledge of a product to the new team, delays in hiring could delay a transition plan.

One can theoretically recover lost time in a workflow by making changes to the steps that comprise the workflow subsequent to the delay or to the perceived or predicted delay, including but not limited to, changing parameters these subsequent steps. For example, if the workflow issue is a supply chain sourcing delay, one could mitigate this delay and reclaim lost time by performing high priority picking and packing along with expedited shipping. Unfortunately, this mitigation strategy presents two important challenges: 1) assessing the counter balancing potential of each step in the workflow; and 2) distributing this reclamation so that it minimizes impact to the original goal of the workflow.

SUMMARY

Shortcomings of the prior art are overcome, and additional advantages are provided through the provision of a computer-implemented method for implementing a counter-balance strategy for handling a disruption in a workflow. The computer-implemented method includes: mapping, by one or more processors, based on analyzing two or more nodes over which tasks comprising the workflow are distributed, each node to one or more parameters utilized to evaluate efficacy of the workflow; determining, based on the mapping, by the one or more processors, costs associated with each node and costs associated with changes to each node; and identifying, by the one or more processors, tasks in the workflow that can be changed to counter disruptions impacting at least one parameter of the one or more parameters utilized to evaluate the efficacy of the workflow.

Shortcomings of the prior art are overcome, and additional advantages are provided through the provision of a computer program product for implementing a counter-balance strategy for handling a disruption in a workflow. The computer program product comprises a storage medium readable by a one or more processors and storing instructions for execution by the one or more processors for performing a method. The method includes, for instance: mapping, by the one or more processors, based on analyzing two or more nodes over which tasks comprising the workflow are distributed, each node to one or more parameters utilized to evaluate efficacy of the workflow; determining, based on the mapping, by the one or more processors, costs associated with each node and costs associated with changes to each node; and identifying, by the one or more processors, tasks in the workflow that can be changed to counter disruptions impacting at least one parameter of the one or more parameters utilized to evaluate the efficacy of the workflow.

Shortcomings of the prior art are overcome, and additional advantages are provided through the provision of a system for implementing a counter-balance strategy for handling a disruption in a workflow. The system includes: a memory, one or more processors in communication with the memory, and program instructions executable by the one or more processors via the memory to perform a method. The method includes, for instance: mapping, by the one or more processors, based on analyzing two or more nodes over which tasks comprising the workflow are distributed, each node to one or more parameters utilized to evaluate efficacy of the workflow; determining, based on the mapping, by the one or more processors, costs associated with each node and costs associated with changes to each node; and identifying, by the one or more processors, tasks in the workflow that can be changed to counter disruptions impacting at least one parameter of the one or more parameters utilized to evaluate the efficacy of the workflow.

Computer systems and computer program products relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

During execution of a multi-step workflow, a delay in one step can be compensated partially or wholly in subsequent steps of the workflow. There are two main challenges in pursuing such a mitigation strategy: 1) assessing a counter balancing potential of each step in a workflow in relation to other steps; and 2) distributing this reclamation so that it minimizes impact to original goal of the workflow while allowing the systems and resources that manage and maintain the workflow to respond to future delays.

Embodiments of the present invention include computer-implemented methods, computer program products, and computer systems that include program code executing on one or more processors that dynamically determines (and implements) a counter-balance strategy for handling a disruption in an event driven workflow. By implementing workflow changes with this strategy, the program code maintains and optimizes the workflow. Thus, embodiments of the present invention can assess a counter balancing potential of each step in a workflow in relation to other steps and/or distribute this reclamation so that it minimizes impact to original goal of the workflow. By distributing the delay, aspects of the examples herein enable allowing the systems and resources that manage and maintain the workflow to respond to future delays.

As will be discussed in greater detail herein, program code in various examples herein determines and can automatically implement a counter-balance strategy for handling disruptions in a workflow. As will be discussed in greater detail herein, in some examples, the program code analyzes one or more nodes of a workflow to identify parameters that control the node and KPIs to which each node and its parameters contribute. The program code can perform this analysis by extracting a correlation between the node's parameter and the KPI from the historic data. This historic data can be saved on a resource accessible to the one or more processors that execute the program code. The program code can also extract a degree of influence a task has for the KPI and create a dependency score between the task in a workflow. In some examples, the program code generates an optimization function to minimize workflow delay, per node counterbalance, and proportionally distributes the counter-balancing load across the node. Thus, the program code can normalize the optimization function with a proportion of times the workflow instances pass through the node and experienced delay in the node. The program code can then execute the optimization function to distribute counter-balance responsibilities across the node.

In these examples, each workflow is understood as comprising various nodes. In a workflow, a node can represent a specific point in a process and/or a resource that is assigned one or more tasks. In the example of a review process, which is provided as a non-limiting example for illustrative purposes only, a node can represent a place/step/aspect in the process where a user and/or automated resource can begin the review process, can approve or reject the asset, and/or can reassign the task. One type of node is a task node that can indicate a workflow task and its assignee. Another type of node is a fork and join node which is a paired nodes and is utilized in a workflow for splitting a process, to be handled by multiple resources, in parallel, and then rejoining when the process is complete. There are also conditional join nodes that can allow a process to proceed as long as the transition from one of the parallel resources is invoked. Nodes referred to as conditional nodes establish a condition before the review process can proceed. To gauge the status of a workflow, a workflow can include a state node that represents a state a workflow sometimes understood as a special state, for example, these nodes can have actions and notifications associated with them. Finally, a workflow can begin with a start node and terminate with an end node. In the context of a workflow that is performed by a computing system, each node can comprise one or more computing resources. In a distributed computing system, including but not limited to a cloud computing system, program code comprising a workflow manager can distribute various tasks comprising a workflow over various nodes, where the nodes represent various computing resources.

Embodiments of the present invention provide an advantage over existing workflow optimization and maintenance processes at least because program code (executing on one or more processors) in the examples herein conducts types of analyses to maintain a workflow in the event of a disruption, that existing processes do not perform and as a result, the efficiency and performance of the workflows maintained and optimized using aspects of the examples herein are superior to those maintained using existing processes. For example, in the examples herein, the program code performs one or more of a node analysis, a cost analysis, and/or a runtime analysis of workflows. As such, the program code can determine changes that could aid the workflows, especially in the face of disruptions, and, in some examples, automatically implement these changes. The runtime analysis performed by the program code in the examples herein, as will be described in greater detail, is an analysis for dynamic multi-objective optimization where number and range of values vary for each node, workflow instance, workflow service level agreement (SLA) goal, and key performance indicator (KPI) priority.

Embodiments of the present invention provide a significant advantage over existing workflow management and maintenance processes. Various advantages are discussed below but are provided as examples, only, and are not meant to be exhaustive. Embodiments of the present invention also directed to a practical application, disruption mitigation in workflow management. And because the examples disclose include a KPI-focused method, the examples herein are applicable across many industries. KPI is used as an example herein of a possible attribute or parameter by which efficiencies of a workflow can be expressed. In other examples, different types of indicators of efficiency or efficacy can be substituted and/or combined with KPI.

In some embodiments of the present invention, the program code correlates the per-node control parameters to KPIs. Existing approaches do not make this correlation. By making this correlation, the program code identifies positive and negative impacts of changing parameter values based on KPI. Hence, the program code in the examples herein determines a contribution of each node and its control parameters on KPI, including each node's contribution to a cost function.

Existing approaches, unlike the program code in the examples herein, do not analyze cross-node counter acting behavior to create cohorts of nodes that counter-act effects on a common KPI. This cohort approach, executed by the program code in the examples herein, represents a significant advantage over existing approaches, and also improves the functionality of the computing system upon which the program code executes. In the examples herein, the program code identifies cohorts of nodes (e.g., comprised of at least two nodes) that can collectively counteract delays at each node. The program code in the embodiments herein can accurately localize the corrective action to specific cohorts compared to a KPI or SLA based minimization/maximization approach across the workflow. The cohort approach improves the functionality of a computing resource engaged in workflow management because it reduces the number of cycles required to negotiate a schedule acceptable across tasks. Existing approaches are less efficient because these systems focus on individual task past performance to calculate and collectively negotiate execution schedule and resource needs for the schedule. In the examples herein, the program code can handle a disruption by identifying specific counter-acting cohorts of tasks. In embodiments of the present invention, the program code correlates across multiple KPI (compared to just the schedule/completion-time) and can isolate specific tasks that need to change parameters and execute differently. Thus, the program code in the examples herein can handle a disruption across just the cohorts that counter-act on the disrupted KPI.

Figure 2:
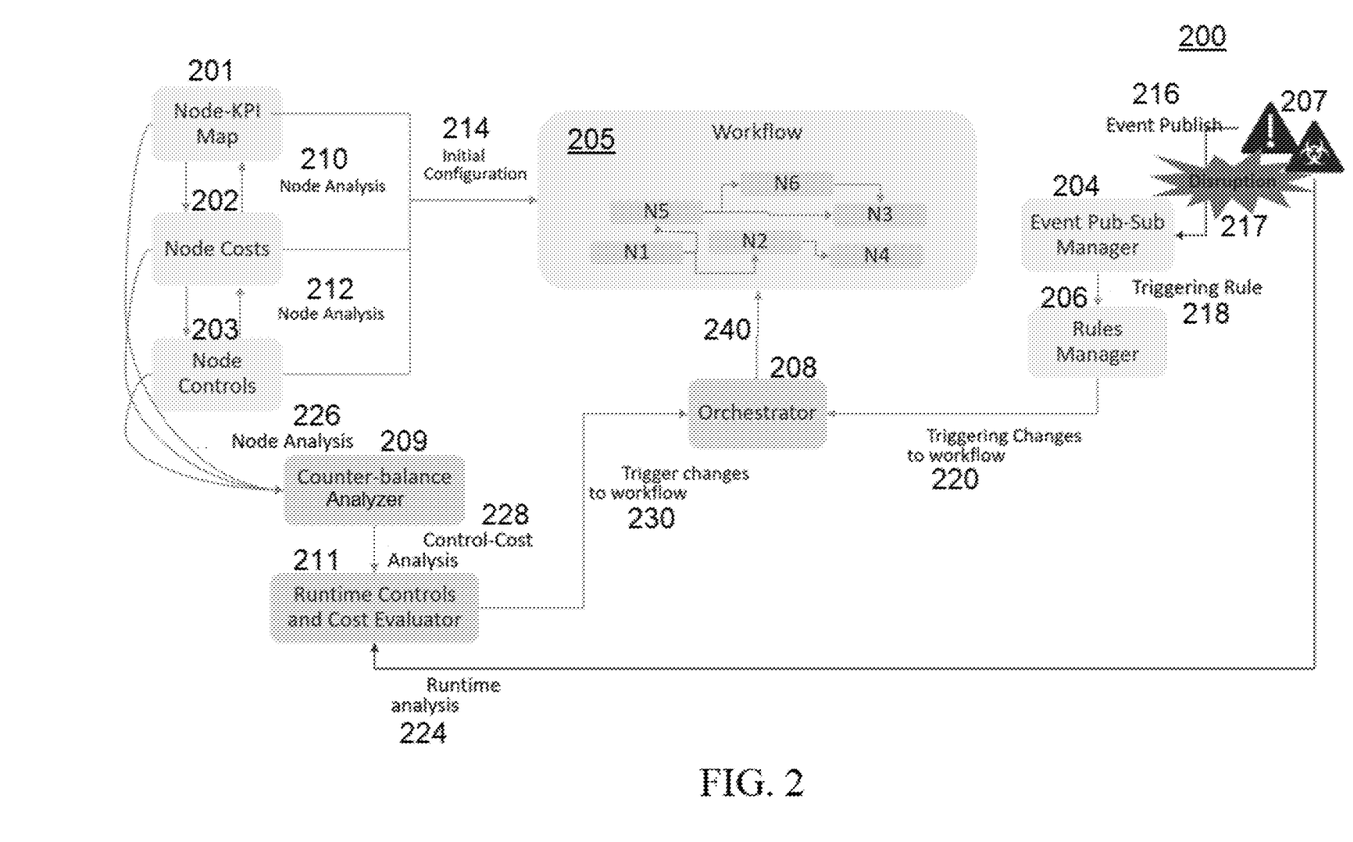
FIG. 2 is a process diagram that illustrates a process of mitigating a disruption in a workflow that includes various aspects in the examples disclosed herein.

The examples herein can include a predictive aspect. In the examples herein, unlike in existing approaches, the program code performs a multi-objective optimization function that balances local and global KPI with corresponding resiliency needs. Based on this function, the program code can predict future disruption given observed disruption. Multi-objective optimization (also referred to as multi-objective programming, multicriteria optimization, multi-attribute optimization, and/or Pareto optimization) is an area of multiple-criteria decision making that is concerned with mathematical optimization problems involving more than one objective function to be optimized simultaneously. In the examples herein, as illustrated in FIG. 2, which will be discussed herein, program code implements changes to a workflow based on both a rules-based individual node analysis and a KPI and cost-based multiple node analysis, the latter of which takes into account connections between nodes. Multi-objective optimization (a type of vector optimization) has been applied in many fields of science, including engineering, economics, and logistics where optimal decisions are taken in the presence of trade-offs between two or more conflicting objectives. Workflow optimization amidst disruption involves weighing various factors and the program code utilizes multi-objective optimization to balance these factors when implementing changes to a workflow after a disruption has occurred (and/or if a disruption is predicted, for example, based on historical data).

As noted above, one challenge in altering subsequent tasks in a workflow to account for a disruption is that to optimize the workflow, one distributes this reclamation so that it minimizes impact to the original goal of the workflow, while allowing the systems and resources that manage and maintain the workflow to respond to future delays. As such, in embodiments of the present invention, in contrast to existing approaches, the program code can balance the need to handle/avoid disruption by spreading the negative impacts of the disruption proportionally across the tasks and retain the task's ability to still have reserve capacity to handle possible future disruptions. When a disruption is handled by changing a downstream task or a small number of downstream tasks, the resources that execute the changes, which may be significant to account for the disruption, may not be available or have reserve capacity to handle future disruption because of the impacts of the change. Spreading these impacts over the system minimizes the effects on each resource which handles a changed task. In some embodiments of the present invention, the program code optimizes the workflow to balances the local (task), global (workflow instance), and historical factors. As such, an outcome of the process, in some embodiments, is a collection of changes executed across multiple tasks in a workflow instead of just a schedule. Thus, the program code can retain a current workflow schedule while handling the disruption by changing parameters of a select subset of tasks.

Various aspects of some embodiments of the present invention represent significant improvements over existing methods because they mitigate disruptions within a workflow while minimizing the impacts of this mitigation on the workflow. In some examples, the program code applies counter-acting measures to short list actions available to mitigate disruptions. In these examples, the program code's proportional distribution of corrective action ensures no one node becomes a bottleneck and avoids causing cascading disruptions by stressing the corrective action on one node, which is an issue with existing approaches. Additionally, as aforementioned, in some embodiments of the present invention, the program code applies a multi-objective optimization function that balances the minimization of the impact on the workflow with proportional distribution of mitigation action in the counter-acting cohort nodes, which maximizes each node's capability to handle predicted disruptions. This aspect provides advantages over existing approaches because, like other aspects discussed above, it ensures the reserve capacity of the nodes are maximized, making each node better equipped to handle future disruptions.

In addition to being directed to a practical application and providing significant advantages over existing approaches to workflow optimization and maintenance, including disruption mitigation, aspects of various embodiments of the present invention are inextricably tied to computing. The examples described herein are inextricably linked to computing as the examples herein provide systems, methods, and computer program products that optimize and can potentially implement migration decisions in workflows across various computing resources, including distributed computing environments and cloud computing environments. In embodiments of the present invention, the program code generates and implements changes to tasks in an automated workflow as a real-time reaction to workflow disruptions. Additionally, the program code can predict these disruptions, based on machine learning and historical data analysis. Thus, the program code in embodiments of the present invention can improve the functionality and efficacy of the computing resources in computing environments, based on optimizing disruption mitigation in a manner that limits excessive processing and conserves resources.

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing a process (or multiple processes) that, e.g., facilitates granular real-time data attainment and delivery including as relevant to soliciting, generating, and timely transmitting, granular product review to consumers. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
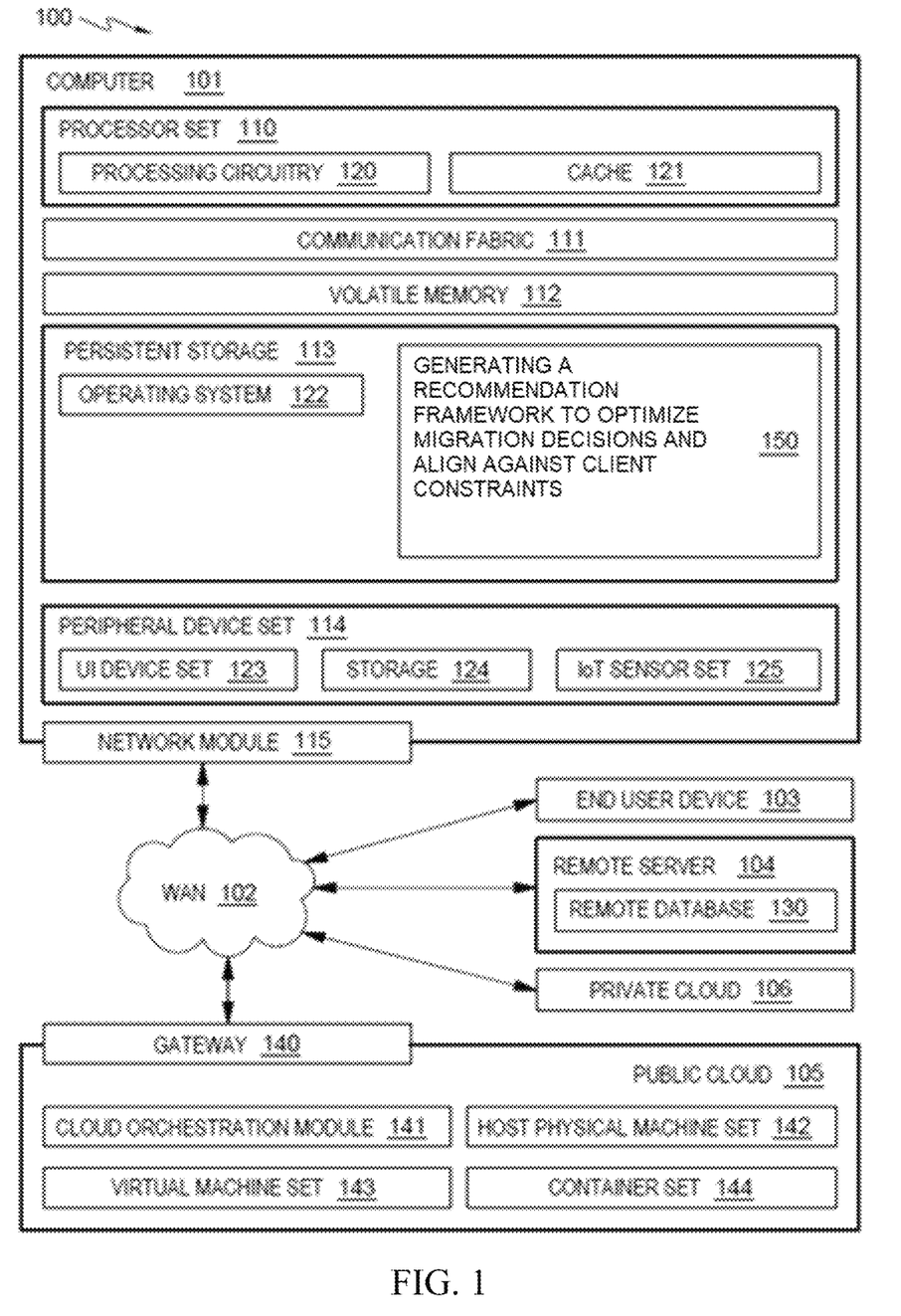
FIG. 1 depicts one example of a computing environment to perform, include and/or use one or more aspects of the present invention.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as a code block for determining and implementing a counter-balance strategy for handling disruptions in a workflow 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices.

Operating system 122 may take several forms, such as various known proprietary operating systems or open-source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation and/or review to an end user, this recommendation would typically be communicated from network module 115 of computer 101 through WAN 102 to EUD 103. In this way, EUD 103 can display, or otherwise present, the recommendation and/or review to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation and/or review based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 is a process diagram 200 that illustrates a process of mitigating a disruption in a workflow that includes various aspects in the examples disclosed herein. FIG. 2 illustrates that aspects of the embodiments herein include a multi-objective optimization of a workflow because program code of an orchestrator 208 implements changes to a workflow (240) based on both a rules-based individual node analysis (e.g., 220) and a KPI and cost-based multiple node analysis (e.g., 230), the latter of which takes into account connections between nodes. Thus, the program code in embodiments of the present invention does not view each node and/or task in isolation when adjusting a workflow to maintain continuity amidst a disruption, but, rather, takes into account the whole of the workflow as well, as well as both global and task specific KPIs, to maximize efficiency and minimize the impacts of the disruptions across the workflow.

As illustrated in FIG. 2, program code executing on one or more processors analyzes nodes N1-N6 of a workflow 205 to determine KPIs affected by each node N1-N6 and the cost associated with the nodes N1-N6 (210). The program code, in analyzing the nodes (210) can map 201 nodes to KPIs and generate or obtain node costs 202. The program code also analyzes the nodes N1-N6 to determine various controls available 203 and cost implications 202 for any changes through those controls 203 (212). In making the determinations related to KPIs and costs and associating various nodes with KPIs and costs, the program code can utilize an existing KPI and cost analysis system, which can be integrated into embodiments of the present invention.

The program code generates an initial configuration for the workflow 205 based on the program code analyzing historic load and forecasted need (214). The program code utilizes a publisher (e.g., messaging) to obtain external events that could impact the workflow (216). Publish/subscribe (pub-sub) messaging provides instant event notifications for distributed processes, including but not limited to, the workflow 205. During runtime, the program code can determine, in this example, via the pub-sub manager 204, that a disruption 207 has occurred (217). Utilizing an event pub-sub manager 204 the program code maps events (including the disruption 207) to rules and triggers the rules in a rules manager 206 (218). Based on the rules, which can be SLA goals, the program code determines one or more changes to the workflow 205 are needed to maintain continuity amidst the disruption 207 and informs program code comprising an orchestrator 208 to trigger an alternate workflow (220). The determinations made by the program code relate to changes that can be made to individual node (e.g., to individual tasks), including changes to parameters, to counter-act the impact of the disruption. However, in some examples, the program code does not provide, at this stage, a recommendation for changes that accounts for the entirety of the workflow. In this example, the orchestrator 208 is illustrated as a separate code module. This configuration is provided as an example of a configuration of the program code and the separate depiction was chosen for illustrative purposes only and not to suggest any limitations.

As understood by one of skill in the art, in some existing systems, dynamic event driven workflows, such as the workflow 205 illustrated in FIG. 2, can detect disruptions and conditionally change parameters of a workflow to change behaviors of a single step or the subsequent workflow. Thus, this portion of the analysis can integrate existing third party systems to perform this rule-based analysis, if this analysis is utilized. In some examples, the program code triggers changes to the workflow (230) based on an additional analyses of the nodes (224, 226, 228) without the utilizing the rules manager 206. Additionally, the program code can utilize existing multi-objective optimization algorithms or machine learning algorithms to optimize the workflow costs at individual steps or of the workflow overall. Thus, as illustrated in FIG. 2, the additional analyses of the nodes (224, 226, 228) in FIG. 2 can be combined with various optimization techniques to optimize and maintain a workflow after a disruption has occurred. When utilizing these existing workflow optimization aspects without the additional analyses described herein, one cannot assess a counter balancing potential of each step in a workflow in relation to other steps or distribute reclamations so that they minimize impacts to the original goal of the workflow while allowing the systems and resources that manage and maintain the workflow to respond to future delays. The additional analyses of the nodes (224, 226, 228) enable these advantages and thus, provides for a more optimized workflow maintenance when disruptions occur.

In embodiments of the present invention, in order for the program code to implement or trigger changes to a workflow (230) and implement the changes in the workflow (240), the program code engages in additional analyses of the nodes (224, 226, 228). Based on determining that a disruption 207 has occurred, the program code performs a runtime analysis for dynamic multi-objective optimization where number and range of values vary for each node, workflow instance, workflow SLA goal, and KPI priority (224). The program code also analyzes each node (226) and performs a cost-control analysis (228). In performing this analysis, which is illustrated, for ease of understanding only and not to suggest any limiting configurations, by program code comprising a counter-balance analyzer 209 and runtime controls and a cost evaluator 211, the program code extracts correlations between parameters of a node in the workflow and KPIs from the historic data and utilizes the correlations to analyze the node to identify parameters that control the node and KPIs to which the node and its parameters contribute.

The program code extracts a degree of influence one or more tasks assigned to the node have for a KPI and creates a dependency score between the one or more tasks in the workflow (and hence, the node and the workflow). The program code also determines a counterbalance potential, i.e., a degree of counterbalance for each task (assigned to a node) by mapping parameters of tasks to KPIs. Thus, the program code determines both the degree of influence of a task or its parameter(s) on the KPI as well as a degree of counterbalance potential. The former is a scalar cost comparison while the latter is a vector. The program code generates an optimization function to minimize workflow delay, per node counterbalance, and proportionally distributes a counter-balancing load across the node. The program code normalizes the optimization function with a proportion of times the workflow instances pass through the node and experienced delays in the node (e.g., historically). The program code executes this optimization function to distribute counter-balance responsibilities across the node. The program code triggers one or more distribution changes in the workflow based on this analysis (230). Based on one or more of the rules-based changes and the node-analysis-based changes, the program code (e.g., comprising the orchestrator 208) implements changes in the workflow (240), including but not limited to, changes parameters of various tasks comprising the workflow and re-assigning various tasks to various nodes. The program code comprising the orchestrator 208 selects the parameters, values, and steps to change in the workflow 205 (240). The orchestrator 208 includes logic to perform multi-objection decision optimization for KPI outcomes for both the workflow 205 and its constituent tasks. As illustrated in FIG. 2, the program code optimizes the workflow to balance the local (task), global (workflow instance), and historical factors. As such, an outcome of the process, in some embodiments, is a collection of changes executed across multiple tasks in a workflow instead of just a schedule (as is done in existing approaches). Thus, the program code can retain a current workflow schedule while handling the disruption by changing parameters of a select subset of tasks.

Figure 3:
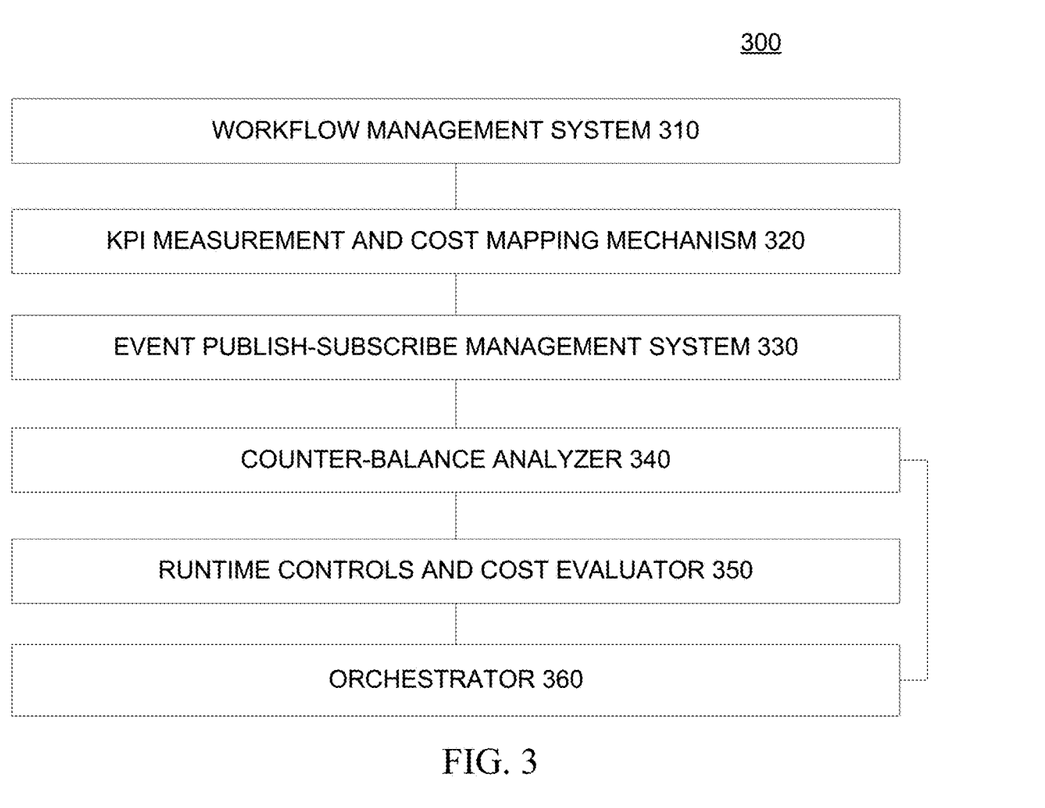
FIG. 3 illustrates some aspects of the certain functionalities of various embodiments of the present invention.

FIG. 3 is a functionality diagram or illustration 300 that breaks various aspects of the examples herein into modules, for illustrative purposes only. The functionality is separate only to promote comprehension as the various functions can be distributed across one or more modules or combined in various modules. Certain of these aspects are also illustrated in FIG. 2 but are illustrated in FIG. 3 to provide further insight. FIG. 3 includes a workflow management system 310, a KPI measurement and cost mapping mechanism 320 (e.g., FIG. 2, 201, 202, 203, 210, 212), an event publish-subscribe management system 330 (e.g., FIG. 2, 216, 204, 206, 217), a counter-balance analyzer 340 (e.g., FIG. 2, 209), a runtime controls and cost evaluator 350 (e.g., FIG. 2, 211), and an orchestrator 360 (e.g., FIG. 2, 208).

In the example illustrated in FIG. 3, the program code of the workflow management system 310 configures, manages, and executes tasks in a pre-configured sequence. The program code of the workflow management system 310 provides parameters to influence task execution and influence conditions that determine flow. This program code can further provide mechanisms (e.g., application programming interfaces (APIs)) to change parameter values). Program code comprising the KPI measurement and cost mapping mechanism 320 can utilize various existing techniques, including but not limited to supply chain operations reference (SCOR) and/or other KPI tracking mechanisms to determine KPI contributions for each step of a workflow based on analyzing historic data (which can be saved on one or more resources accessible to the program code). Program code comprising the event publish-subscribe management system 330 (which can be an existing mechanism) can detect disruption events and inform the orchestrator 360 that of corrective actions.

As explained herein, it is through the inclusion of the counter-balance analyzer 340 and the runtime controls and cost evaluator 350 that various advantages of the embodiments described herein are realized. The program code determines a contribution of each node and its control parameters on KPI, i.e., its contribution to a cost function. Program code comprising the counter-balance analyzer 340 determines a degree of influence (e.g., based on a pre-determined scale which can include a finite number of possibilities and is pre-configured) each task (where the tasks are assigned to nodes) has for a KPI. The program code extrapolates the degree of influence to dependency scores between tasks in the workflow. The program code correlates the per-node control parameters to KPIs.

The program code optimizes the workflow to balance the local (task), global (workflow instance), and historical factors. Program code comprising runtime controls and cost evaluator 350 optimizes cost distribution during rebalancing. The program code adapts an optimization algorithm to minimize cost impacts over the overall workflow, maximize preservations of a task's ability to withstand future disruptions, and mitigates the disruption. In some examples, the program code generates an optimization target equation that combines SLA goals with KPI ranges that corresponds to minimum and maximum values of parameters and the counter-acting scores. The program code can generate this equation because based on making the program code of the counter-balance analyzer 340 correlating KPIs and costs to nodes, the program code of the runtime controls and cost evaluator 350 can identify positive and negative impacts of changing parameter values based on KPI. The program code enables the localization of corrective actions because the program code identifies cohorts of nodes (e.g., comprised of at least two nodes) that can collectively counteract delays at each node. The program code can provide this information to the orchestrator 360 so that the orchestrator 360 can accurately localize the corrective action to specific cohorts. Localizing the corrective actions to cohorts reduces the number of cycles to negotiate a schedule (e.g., changes to a workflow) acceptable across tasks. Thus, the program code of the counter-balance analyzer 340 can handle a disruption by identifying specific counter-acting cohorts of tasks. In embodiments of the present invention, the counter-balance analyzer 340 can map parameters to KPIs and calculate the degree of counterbalance of each step (in addition to mapping costs). By mapping the degree of counterbalance, embodiments of the present invention operated in a vector space compared to scalar cost comparisons. A degree of influence of a step (e.g., task) or its parameter on the KPI versus its degree of counterbalance potential are correlated but not the same. The program code of the counter-balance analyzer 340 is performing and additional abstraction that allows the optimization algorithm utilized by the program code to focus on specific counter-groups of tasks, can be a subset of tasks contributing to a KPI/cost, and overall tasks in the workflow. Hence, the program code can balance the need to handle/avoid disruption with spreading the negative impacts of the disruption proportionally across the tasks. Thus, the program code of the runtime controls and cost evaluator 350 minimizes cost impacts over the overall workflow, enables the orchestrator 360, when it implements workflow changes, to maximize preservation of a task's ability to withstand future disruptions while mitigating the disruption.

The orchestrator 360 can obtain various data from different analyses and utilize these data to implement changes in a workflow. The program code comprising the orchestrator 360 selects the parameters, values, and steps to change in the workflow. In implementing these changes, the program code of the orchestrator 360 can utilize logic to perform multi-objective decision optimization for KPI outcomes for both the workflow as well as its constituent tasks. Two non-limiting examples of multi-objective optimization, which can be integrated into embodiments of the present invention are Pareto and scalarization. In the Pareto method, there is a dominated solution and a non-dominated solution obtained by a continuously updated algorithm. Meanwhile, the scalarization method creates multi-objective functions made into a single solution using weights. There are three types of weights in scalarization which are equal weights, rank order centroid weights, and rank-sum weights.

Figure 4:
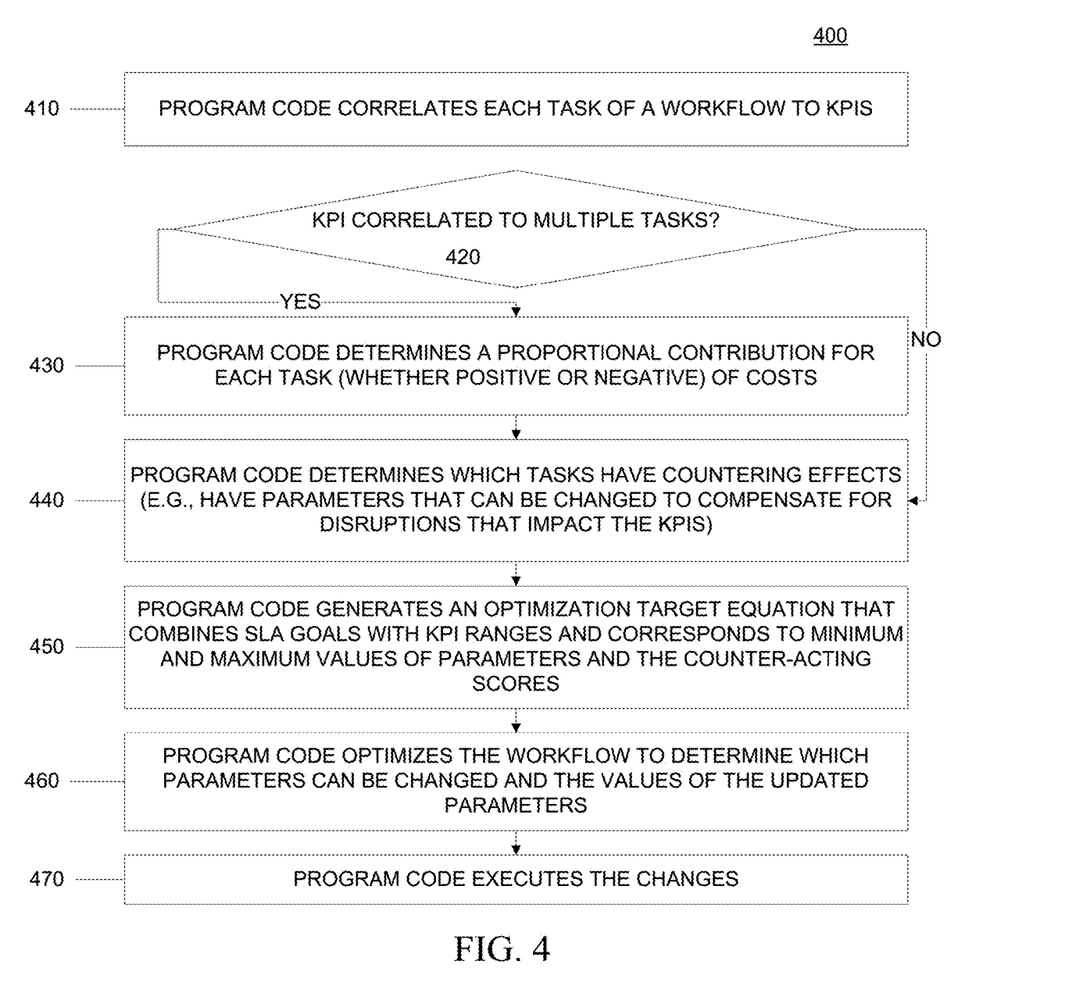
FIG. 4 is a workflow that illustrates the integration of aspects of the examples herein into a supply chain management system.

A non-limiting example of a system in which aspects of the present invention can be implemented is a supply chain management system. This example is provided for illustrative purposes only and not to suggest any limitations. FIG. 4 is a workflow 400 that illustrates the integration of aspects of the examples herein into a supply chain management system. The workflow of the supply chain management system includes the following tasks: order create, order approve, source, reserve, release, schedule, pick, pack, ship, and deliver. Having been integrated into this system, in the workflow 400, the program code correlates each task of a workflow (e.g., order create, order approve, source, reserve, release, schedule, pick, pack, ship, and deliver) to KPIs (e.g., days of supply, cost to deliver, package cycle time, etc.) (410). If the program code determines that a KPI is contributed to by multiple tasks (420), the program code determines a proportional contribution for each task (whether positive or negative) of costs (430). To make this determination (420), the program code utilizes historical records to compare time and cost for executing each task (contributing to the KPI) with the effect on the KPI. The program code determines which tasks have countering effects (e.g., have parameters that can be changed to compensate for disruptions that impact the KPIs, for each KPI) (440). The program code identifies the tasks with countering effects by representing them in vector spaces where dimensions are the configuration parameters available for the tasks. The program code determines the values of the parameters based on current values and allowed ranges of change (which can be pre-configures based on system constraints, including but not limited to, SLAs and technical limitations). The program code generates an optimization target equation that combines SLA goals with KPI ranges and corresponds to minimum and maximum values of parameters and the counteracting scores (450). The program code optimizes the workflow to determine which parameters can be changed and the values of the updated parameters (460). The program code executes the changes (470). In some examples, the program code can utilize an orchestrator to execute the changes.

Embodiments of the present invention include computer-implemented methods, computer systems, and computer program products for implementing a counter-balance strategy for handling a disruption in a workflow. In some examples, the method includes program code executed by one or more processors mapping, based on analyzing two or more nodes over which tasks comprising the workflow are distributed, each node to one or more parameters utilized to evaluate efficacy of the workflow, the program code determining, based on the mapping, costs associated with each node and costs associated with changes to each node, and the program code identifying tasks in the workflow that can be changed to counter disruptions impacting at least one parameter of the one or more parameters utilized to evaluate the efficacy of the workflow.

In some examples, the program code obtains, during runtime of the workflow, an indication of a given disruption in the workflow impacting at least one parameter of the one or more parameters utilized to evaluate the efficacy of the workflow. Based on obtaining the indication, the program code generates, based on a rules manager, possible changes to individual nodes of the workflow, the individual nodes comprising the identified tasks, to mitigate the disruption. Based on obtaining the indication, the program code performs a runtime analysis for dynamic multi-objective optimization for the workflow, where the analysis comprises generating or updating an algorithm to weight impacts of the possible changes to the individual nodes of the workflow.

In some examples, the program code applies the algorithm to select one or more changes of the possible changes to the workflow. During the runtime, the program code can implement the one or more changes in the workflow and execute the one or more changes.

In some examples, the one or more parameters utilized to evaluate the efficacy of the workflow comprise key performance indicators.

In some examples, the program code generates the initial workflow, based on the mapping and the costs.

In some examples, the program code identifying the tasks in the workflow that can be changed is based on the mapping, the costs, and historical data.

In some examples, the tasks in the workflow that can be changed to counter the disruptions comprise at least two nodes of the two or more nodes.

In some examples, the program code executing the one or more changes comprises the program code executing changes to the at least two nodes where the changes to the at least two nodes collectively counteract delays in the workflow at each node of the at least two nodes.

In some examples, the one or more changes utilize the mappings to spread the one or more changes proportionally across nodes of the two or more nodes mapped to the at least one parameter.

In some examples, the implemented one or more changes in the workflow comprise localized corrective actions to the nodes of the two or more nodes mapped to the at least one parameter.

In some examples, the mapping further comprises: the program code determining a proportional contribution to each of the one or more parameters utilized to evaluate the efficacy of the workflow for each node mapped to each parameter.

In some examples, the program code determining the proportional contribution further comprises, for each task: the program code determines a degree of influence for the task on each parameter, extrapolates the degree of influence to dependency scores between the task and the workflow, and correlates control parameters for the task to each parameter.

In some examples, the rules manager comprises constraints based on service level agreement goals.

In some examples, the one or more parameters utilized to evaluate the efficacy of the workflow comprise key performance indicators (KPI), the key performance indicators comprise ranges, and performing the runtime analysis comprises: the program code generating an optimization target equation that combines the service level agreement goals with ranges of the KPIs, and the program code utilizing the optimization target equation to generate minimum and maximum values of parameters for the possible changes.

In some examples, the program code applying the algorithm comprises the program code selecting parameters for each change of the one or more changes, wherein the selected parameters are between the minimum and maximum values generated by the optimization target equation.

In some examples, the program code identifying the tasks in the workflow that can be changed to counter the disruptions comprises: the program code mapping additional parameters of the two or more nodes to the one or more parameters utilized to evaluate efficacy of the workflow, the program code calculating a degree of counterbalance of each task comprising the two or more nodes, and based on the calculating, the program code identifying a specific group of tasks to counterbalance each change to the workflow.

Although various embodiments are described above, these are only examples. For example, reference architectures of many disciplines may be considered, as well as other knowledge-based types of code repositories, etc., may be considered. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method for implementing a counter-balance strategy for handling a disruption in a workflow, the method comprising:
    mapping, by one or more processors, based on analyzing two or more nodes over which tasks comprising the workflow are distributed, each node to one or more parameters utilized to evaluate efficacy of the workflow;
    determining, based on the mapping, by the one or more processors, costs associated with each node and costs associated with changes to each node;
    identifying, by the one or more processors, tasks in the workflow that can be changed to counter disruptions impacting at least one parameter of the one or more parameters utilized to evaluate the efficacy of the workflow;
    obtaining, by the one or more processors, during runtime of the workflow, an indication of a given disruption in the workflow impacting at least one parameter of the one or more parameters utilized to evaluate the efficacy of the workflow;
    based on obtaining the indication, generating, by the one or more processors, based on a rules manager, possible changes to individual nodes of the workflow, the individual nodes comprising the identified tasks, to mitigate the disruption; and
    based on obtaining the indication, performing, by the one or more processors, a runtime analysis for dynamic multi-objective optimization for the workflow, wherein the analysis comprises generating or updating an algorithm to weight impacts of the possible changes to the individual nodes of the workflow.

2. The computer-implemented of claim 1, further comprising:
    applying, by the one or more processors, the algorithm to select one or more changes of the possible changes to the workflow; and
    during the runtime, implementing, by the one or more processors, the one or more changes in the workflow and executing the one or more changes.

3. The computer-implemented method of claim 2, wherein the one or more changes utilize the mappings to spread the one or more changes proportionally across nodes of the two or more nodes mapped to the at least one parameter.

4. The computer-implemented method of claim 3, wherein the implemented one or more changes in the workflow comprise localized corrective actions to the nodes of the two or more nodes mapped to the at least one parameter.

5. The computer-implemented of claim 1, wherein the one or more parameters utilized to evaluate the efficacy of the workflow comprise key performance indicators.

6. The computer-implemented method of claim 2, wherein the rules manager comprises constraints based on service level agreement goals.

7. The computer-implemented method of claim 6, wherein the one or more parameters utilized to evaluate the efficacy of the workflow comprise key performance indicators (KPI), wherein the key performance indicators comprise ranges, and wherein performing the runtime analysis comprises:
    generating, by the one or more processors, an optimization target equation that combines the service level agreement goals with ranges of the KPIs; and
    utilizing, by the one or more processors, the optimization target equation to generate minimum and maximum values of parameters for the possible changes.

8. The computer-implemented method of claim 7, wherein applying the algorithm comprises selecting parameters for each change of the one or more changes, wherein the selected parameters are between the minimum and maximum values generated by the optimization target equation.

9. The computer-implemented of claim 1, further comprising:
    generating, by the one or more processors, the initial workflow, based on the mapping and the costs.

10. The computer-implemented method of claim 1, wherein identifying the tasks in the workflow that can be changed is based on the mapping, the costs, and historical data.

11. The computer-implemented method of claim 1, wherein the tasks in the workflow that can be changed to counter the disruptions comprise at least two nodes of the two or more nodes.

12. The computer-implemented method of claim 11, wherein executing the one or more changes comprises executing changes to the at least two nodes wherein the changes to the at least two nodes collectively counteract delays in the workflow at each node of the at least two nodes.

13. The computer-implemented method of claim 1, the mapping further comprises:
  determining, by the one or more processors, a proportional contribution to each of the one or more parameters utilized to evaluate the efficacy of the workflow for each node mapped to each parameter.

14. The computer-implemented method of claim 13, wherein determining the proportional contribution further comprises:
  for each task:
    determining, by the one or more processors, a degree of influence for the task on each parameter;
    extrapolating, by the one or more processors, the degree of influence to dependency scores between the task and the workflow; and
    correlating, by the one or more processors, control parameters for the task to each parameter.

15. The computer-implemented of claim 1, wherein identifying the tasks in the workflow that can be changed to counter the disruptions comprises:
  mapping, by one or more processors, additional parameters of the two or more nodes to the one or more parameters utilized to evaluate efficacy of the workflow;
  calculating, by the one or more processors, a degree of counterbalance of each task comprising the two or more nodes; and
  based on the calculating, identifying, by the one or more processors, a specific group of tasks to counterbalance each change to the workflow.

16. A computer system for implementing a counter-balance strategy for handling a disruption in a workflow, the computer system comprising:
  a memory; and
  one or more processors in communication with the memory, wherein the computer system is configured to perform a method, said method comprising:
    mapping, by the one or more processors, based on analyzing two or more nodes over which tasks comprising the workflow are distributed, each node to one or more parameters utilized to evaluate efficacy of the workflow;
    determining, based on the mapping, by the one or more processors, costs associated with each node and costs associated with changes to each node;
    identifying, by the one or more processors, tasks in the workflow that can be changed to counter disruptions impacting at least one parameter of the one or more parameters utilized to evaluate the efficacy of the workflow;
    obtaining, by the one or more processors, during runtime of the workflow, an indication of a given disruption in the workflow impacting at least one parameter of the one or more parameters utilized to evaluate the efficacy of the workflow;
    based on obtaining the indication, generating, by the one or more processors, based on a rules manager, possible changes to individual nodes of the workflow, the individual nodes comprising the identified tasks, to mitigate the disruption; and
    based on obtaining the indication, performing, by the one or more processors, a runtime analysis for dynamic multi-objective optimization for the workflow, wherein the analysis comprises generating or updating an algorithm to weight impacts of the possible changes to the individual nodes of the workflow.

17. The computer system of claim 16, further comprising:
  applying, by the one or more processors, the algorithm to select one or more changes of the possible changes to the workflow; and
  during the runtime, implementing, by the one or more processors, the one or more changes in the workflow and executing the one or more changes.

18. A computer program product for implementing a counter-balance strategy for handling a disruption in a workflow, the computer program product comprising:
  one or more computer readable storage media and program instructions collectively stored on the one or more computer readable storage media readable by at least one processing circuit to perform a method comprising:
    mapping, by the one or more processors, based on analyzing two or more nodes over which tasks comprising the workflow are distributed, each node to one or more parameters utilized to evaluate efficacy of the workflow;
    determining, based on the mapping, by the one or more processors, costs associated with each node and costs associated with changes to each node;
    identifying, by the one or more processors, tasks in the workflow that can be changed to counter disruptions impacting at least one parameter of the one or more parameters utilized to evaluate the efficacy of the workflow;
    obtaining, by the one or more processors, during runtime of the workflow, an indication of a given disruption in the workflow impacting at least one parameter of the one or more parameters utilized to evaluate the efficacy of the workflow;
    based on obtaining the indication, generating, by the one or more processors, based on a rules manager, possible changes to individual nodes of the workflow, the individual nodes comprising the identified tasks, to mitigate the disruption; and
    based on obtaining the indication, performing, by the one or more processors, a runtime analysis for dynamic multi-objective optimization for the workflow, wherein the analysis comprises generating or updating an algorithm to weight impacts of the possible changes to the individual nodes of the workflow.

* * * * *